US012592255B2

(12) United States Patent
Sherwood et al.

(10) Patent No.: US 12,592,255 B2
(45) Date of Patent: Mar. 31, 2026

(54) HOLOGRAPHIC STORAGE HARDWARE ENABLED LOCKING

(71) Applicant: INTERNATIONAL BUSINESS MACHINES CORPORATION, Armonk, NY (US)

(72) Inventors: Thomas Michael Sherwood, Poughkeepsie, NY (US); Tristan Justine Langley, Beacon, NY (US); Andrew C. M. Hicks, Highland, NY (US); Ryan Thomas Rawlins, Poughkeepsie, NY (US); Joshua Edward Beha, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/757,134

(22) Filed: Jun. 27, 2024

(65) Prior Publication Data

US 2026/0004811 A1    Jan. 1, 2026

(51) Int. Cl.
*G11B 20/10*        (2006.01)
*G11B 7/0065*       (2006.01)

(52) U.S. Cl.
CPC ...... *G11B 20/10009* (2013.01); *G11B 7/0065* (2013.01)

(58) Field of Classification Search
None
See application file for complete search history.

(56)        References Cited

U.S. PATENT DOCUMENTS

| | | | | |
|---|---|---|---|---|
| 6,147,782 | A * | 11/2000 | Daiber ................. | G11B 7/0065 |
| 6,212,148 | B1 * | 4/2001 | Hesselink ............ | G11B 7/0065 |
| 8,169,676 | B2 | 5/2012 | Przygodda et al. | |
| 2003/0067639 | A1 * | 4/2003 | Wilson ................ | G11B 7/08511 |
| 2007/0115523 | A1 * | 5/2007 | Matsumura .......... | G11B 7/0065 |
| 2008/0112293 | A1 * | 5/2008 | Morimoto ............ | G11B 7/1378 |
| | | | | 369/94 |

FOREIGN PATENT DOCUMENTS

WO        2010/148279 A2    12/2010

OTHER PUBLICATIONS

Anonymous, "Holographic Storage—Hardware Semaphore," an IP.com Prior Art Database Technical Disclosure, IP.com No. IPCOM000267597D, IP.com Electronic Publication Date: Nov. 9, 2021, 5 pages.
Anscombe, "Holographic Data Storage: When Will It Happen?," https://www.photonics.com/Articles/Holographic_Data_Storage_When_Will_It_Happen/a16229, Published: Jun. 2003, 6 pages.

(Continued)

*Primary Examiner* — Peter Vincent Agustin
(74) *Attorney, Agent, or Firm* — Onyx IP Group

(57)        ABSTRACT

Holographic storage hardware enabled locking includes directing a first reference beam associated with a first process at a storage location in a holographic data storage medium, and detecting, with a detector while the first reference beam is directed at the storage location, whether a second reference beam associated with a second process is also directed at the storage location. Based on the detecting, a signal is generated indicating whether the storage location is locked.

25 Claims, 8 Drawing Sheets

(56) References Cited

OTHER PUBLICATIONS

Ashley et al., "Holographic Data Storage," IBM Journal of Research and Development, vol. 44, Issue 3, Date of Publication: May 2000, DOI: 10.1147/rd.443.0341, 29 pages.

Brito, "Holography & the Basics of Holographic Storage," Novanta Photonics, https://novantaphotonics.com/holography-and-holographic-storage-basics/, Retrieved on Jan. 30, 2024, 2 pages.

D. Shatkov, "Holographic Data Storage: Old and New," HYPERVSN Blog, https://hypervsn.com/blog/holographic-data-storage-old-and-new.html, Mar. 3, 2023, 3 pages.

Thomsen "How Does Holographic Storage Work?," Microsoft Research, https://www.microsoft.com/en-us/research/video/how-does-holographic-storage-work/#:~:text=This%20video%20shows%20how%20holographic,after%20erasure%20with%20UV%20light., Sep. 22, 2020, 1 page.

International Searching Authority, "Notification of Transmittal of the International Search Report and the Written Opinion of the International Searching Authority, or Declaration," Patent Cooperation Treaty, Sep. 22, 2025, 12 pages, International Application No. PCT/EP2025/065020.

* cited by examiner

Figure 1:
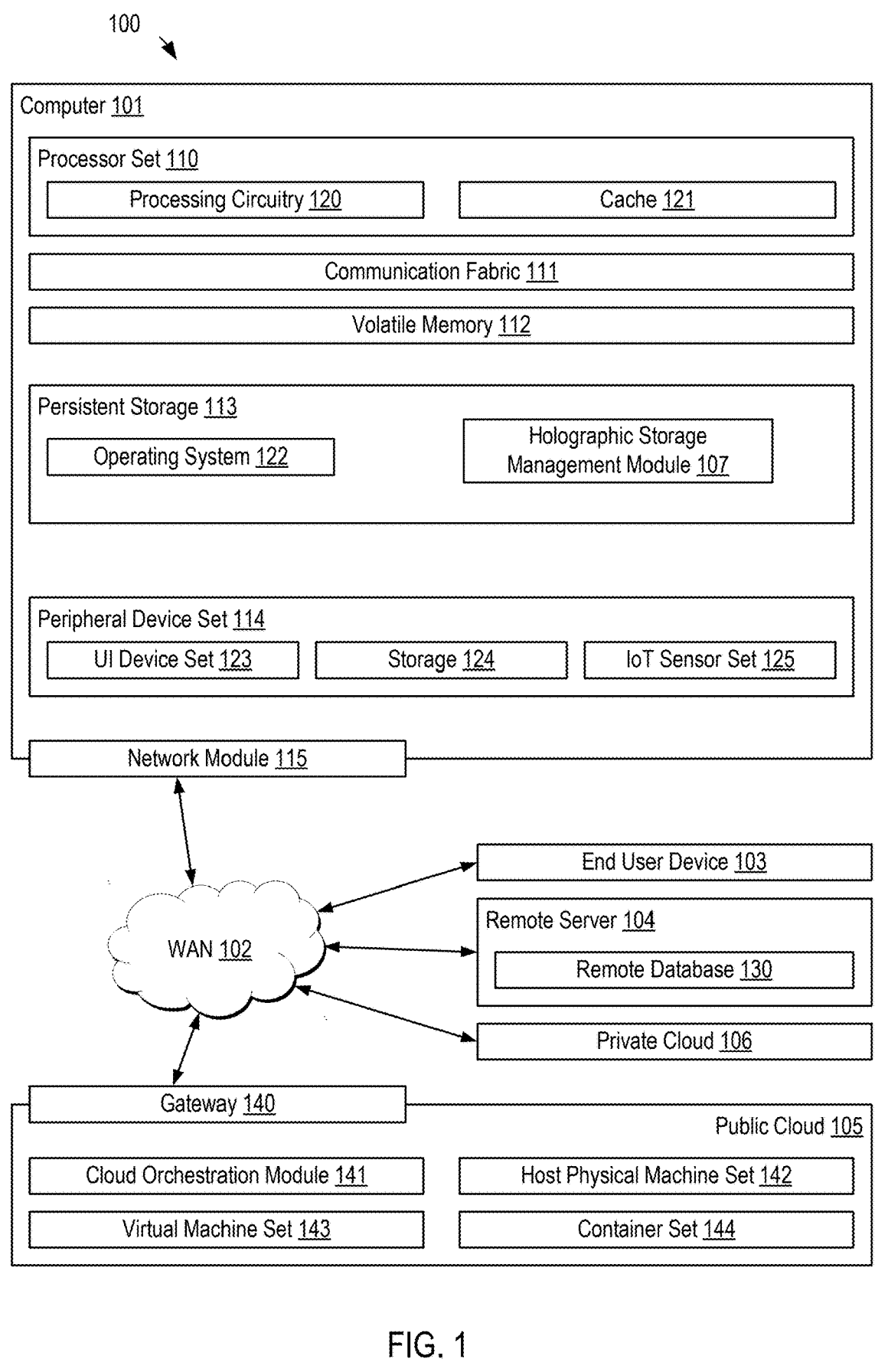

100

Computer 101

Processor Set 110

| Processing Circuitry 120 | Cache 121 |

Communication Fabric 111

Volatile Memory 112

Persistent Storage 113

| Operating System 122 | Holographic Storage Management Module 107 |

Peripheral Device Set 114

| UI Device Set 123 | Storage 124 | IoT Sensor Set 125 |

Network Module 115

WAN 102

End User Device 103

Remote Server 104

Remote Database 130

Private Cloud 106

Gateway 140

Public Cloud 105

| Cloud Orchestration Module 141 | Host Physical Machine Set 142 |
| Virtual Machine Set 143 | Container Set 144 |

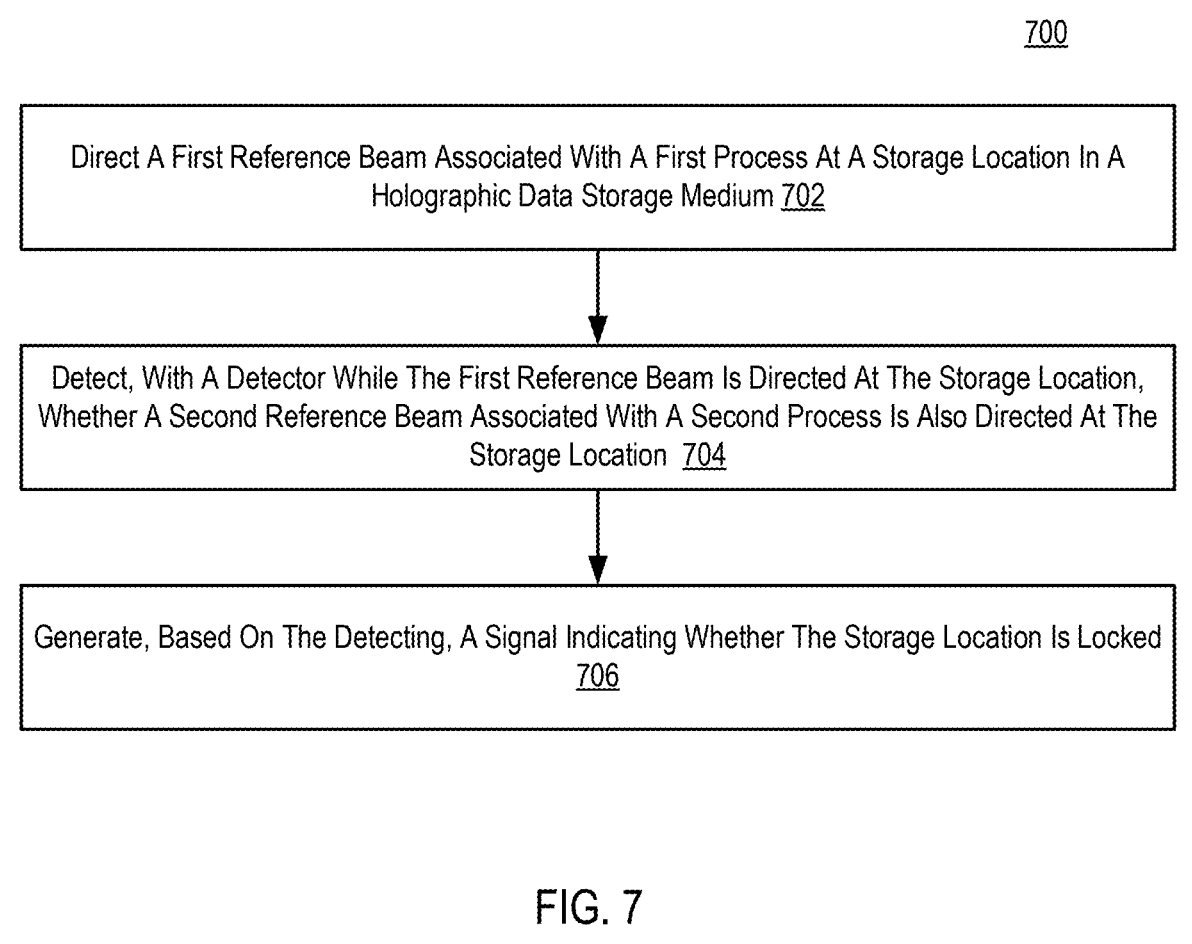

Direct A First Reference Beam Associated With A First Process At A Storage Location In A Holographic Data Storage Medium 702

Detect, With A Detector While The First Reference Beam Is Directed At The Storage Location, Whether A Second Reference Beam Associated With A Second Process Is Also Directed At The Storage Location 704

Generate, Based On The Detecting, A Signal Indicating Whether The Storage Location Is Locked 706

FIG. 7

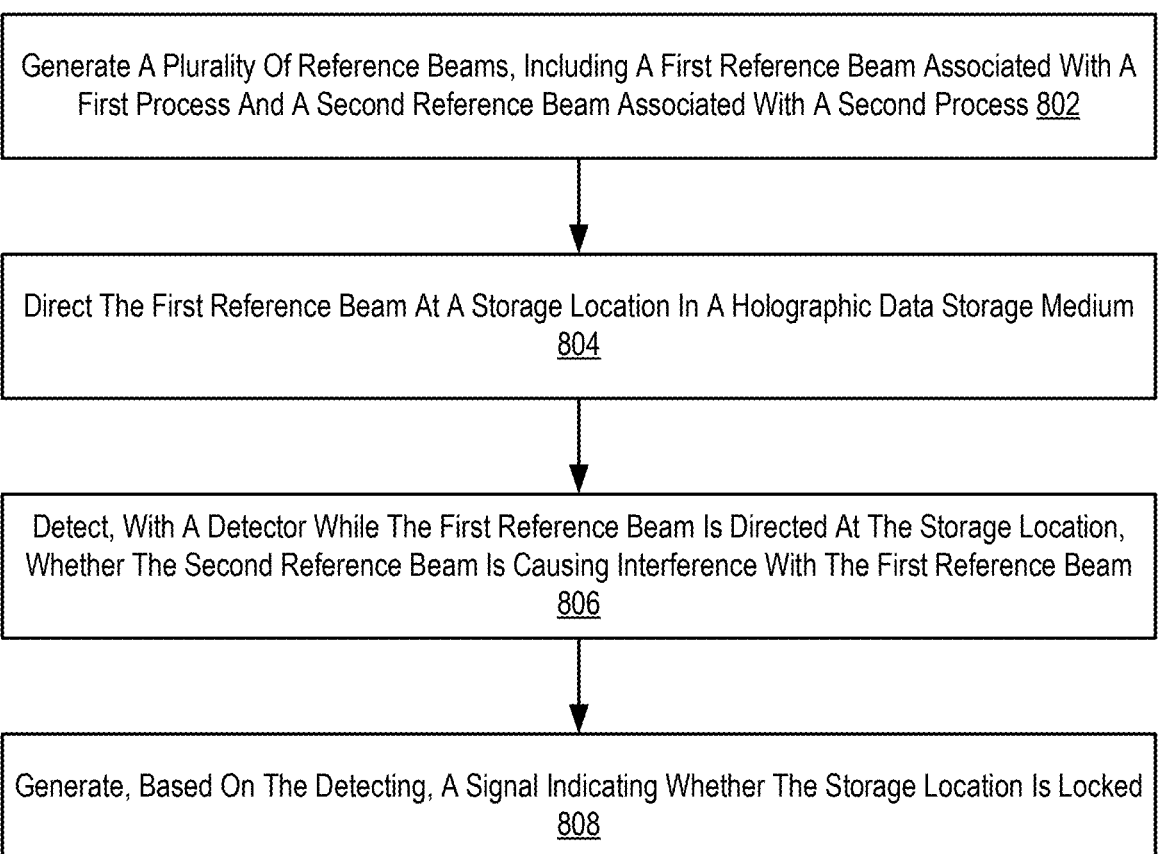

800

Generate A Plurality Of Reference Beams, Including A First Reference Beam Associated With A First Process And A Second Reference Beam Associated With A Second Process 802

Direct The First Reference Beam At A Storage Location In A Holographic Data Storage Medium 804

Detect, With A Detector While The First Reference Beam Is Directed At The Storage Location, Whether The Second Reference Beam Is Causing Interference With The First Reference Beam 806

Generate, Based On The Detecting, A Signal Indicating Whether The Storage Location Is Locked 808

FIG. 8

HOLOGRAPHIC STORAGE HARDWARE ENABLED LOCKING

BACKGROUND

The present disclosure relates to methods, apparatus, and products for holographic storage hardware enabled locking.

SUMMARY

According to embodiments of the present disclosure, various methods, apparatus and products for holographic storage hardware enabled locking are described herein. In some aspects, holographic storage hardware enabled locking includes directing a first reference beam associated with a first process at a storage location in a holographic data storage medium, and detecting, with a detector while the first reference beam is directed at the storage location, whether a second reference beam associated with a second process is also directed at the storage location. Based on the detecting, a signal is generated indicating whether the storage location is locked.

BRIEF DESCRIPTION OF THE DRAWINGS

FIG. 1 sets forth an example computing environment according to aspects of the present disclosure.

FIG. 7 sets forth a flowchart of an example method for holographic storage hardware enabled locking according to aspects of the present disclosure.

FIG. 8 sets forth a flowchart of an example method for holographic storage hardware enabled locking according to further aspects of the present disclosure.

DETAILED DESCRIPTION

Figure 2:
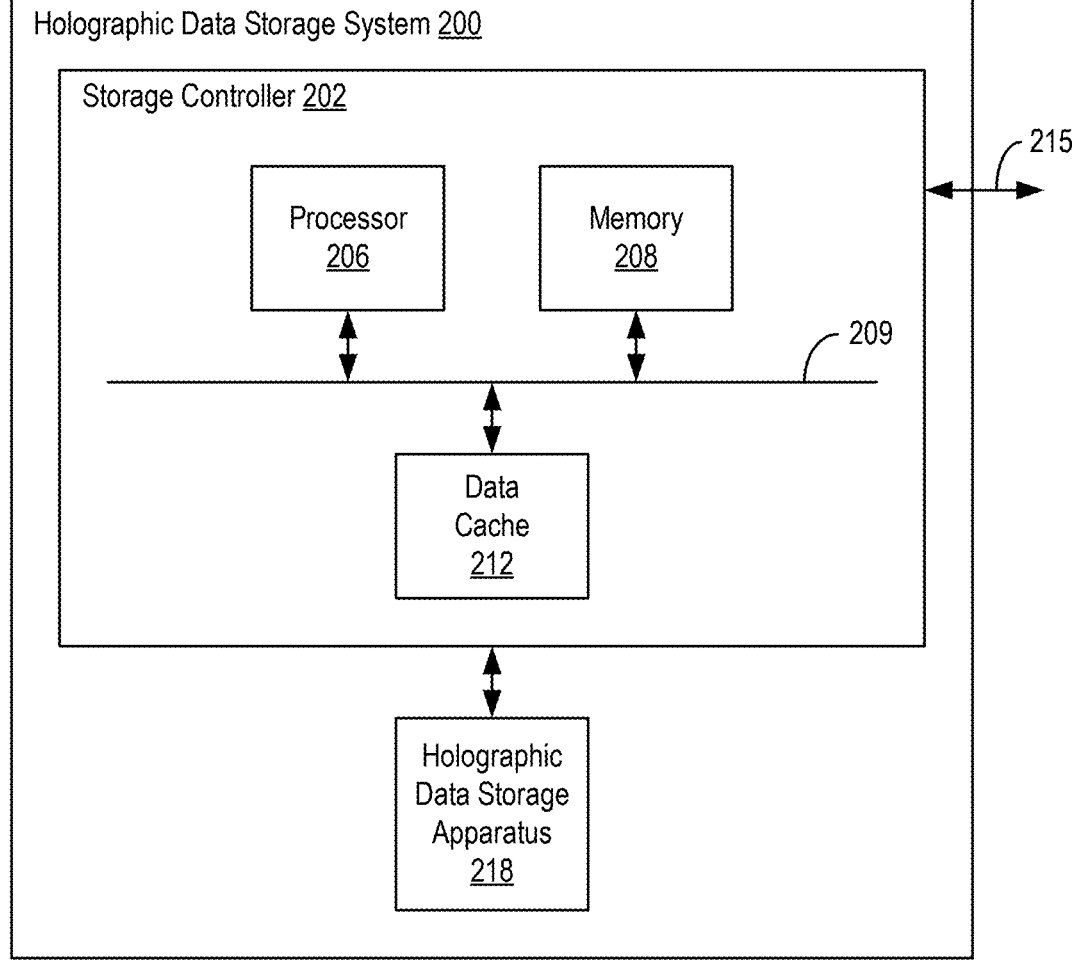
FIG. 2 sets forth an example holographic data storage system according to aspects of the present disclosure.

Holographic data storage provides a high density data storage capability. In holographic data storage, an entire page of information may be stored at once as an optical interference pattern within a holographic data storage medium, such as a photosensitive optical material. This may be done by intersecting two coherent laser beams within the storage medium. The first beam, which may be referred to as the data beam, contains the information to be stored. The data beam may also be referred to as a signal beam. The data beam may be two-dimensional in nature and include a rectangular image of a large number of bits arranged in a raster pattern. The second beam, which may be referred to as the reference beam, may be designed to be simple to reproduce, such as a simple collimated beam with a planar wavefront.

To write data to a holographic data storage medium with a write operation, the data beam and the reference beam are separately directed to the holographic data storage medium and intersect and interfere to form an interference wave front. The intersection of the data beam and the reference beam result in an optical interference pattern that causes chemical and/or physical changes in the storage medium, and a replica of the interference pattern is stored as a holographic image known as a hologram in the holographic data storage medium, which contains the encoded data.

To read data from a holographic data storage medium with a read operation, when the stored interference pattern is illuminated with a reference beam sent at the same angle as during recording, some of this incident light is diffracted by the stored interference pattern in such a fashion that the data beam is reconstructed.

A large number of these interference patterns or holograms can be superimposed in the same holographic data storage medium and can be accessed independently, as long as they are distinguishable by the direction or the spacing of the patterns. Such separation can be accomplished by changing the angle between the object and reference wave or by changing the laser wavelength. Any particular data page can then be read out independently by illuminating the stored patterns with the reference beam that was used to store that page.

Some examples disclosed herein use holographic storage and provide faster and more secure serialization methods beyond what current operating system enabled features allow. As an example of serialization with an operating system, assume that a first process wishes to switch a string "hello", which is currently equal to "world", to be equal to "ABC". First, the first process queries the operating system to determine if the value is locked. If the value is not locked, the first process may request an exclusive lock, and once it is granted, begin writing to string "hello". While the first process is writing, assume that a second process also wishes to write to string "hello" to be equal to "team". The second process requests an exclusive lock from the operating system, but it is not granted until the first process removes its lock on the value. Assume further that, while the second process is waiting for its exclusive lock to be granted, a third process requests a read lock from the operating system, but it is not granted until the exclusive locks of the first process and the second process are removed.

When the first process completes its change to the string "hello" and removes its exclusive lock, the operating system grants the lock to the second process, and sends the second process an interrupt to indicate the string "hello" is ready to be written to. At this time, the third process is still blocked from reading until the lock from the second process is removed. Once the second process completes its change to the string "hello" and the exclusive lock requested by the second process is removed, an interrupt is sent to the third process, which begins reading the new value from the string "hello", which is currently equal to "team". While the third process is reading, assume that the first process also requests a read lock on the string "hello". The operating system grants the read lock to both the first process and the third process simultaneously. Assume next that the third process is finished reading and removes its read lock, and the first process is still reading the string "hello" when the second process requests an exclusive lock to write a new value to the string. The exclusive lock is not granted to the second process until the first process removes its read lock, so the second process must once again wait for an interrupt from the operating system.

Some examples disclosed herein use holographic storage in a manner that enables systems to have stronger, more robust locks and use faster and more secure serialization methods beyond what the current operating system enabled features allow. Shifting the logic into the hardware frees up computing resources to allow for greater efficiency from the system's standpoint while serializing on various resources. Some examples use interference patterns and move the data buffer to the gating laser, which facilitates hardware-based locking using the interference patterns from the light from emitters to get faster, more efficient locking structures on the hardware level instead of implementing extra checks in the operating system layer.

Holographic storage makes use of reference and data laser beams to read and write data into the storage medium. Some examples disclosed herein are directed to a method of writing data in holographic storage. Some examples utilize the reference beam to determine, on a hardware level, if data is in-use or free to be written to. If data is in-use, a scatter pattern is generated when a second reference beam interferes with an active reference beam. This scatter/interference pattern is detectable by the second program or user looking to read or write that specific section of data. The pattern, in this case, acts as a mode of serialization that is built into the storage directly. This reduces the need to implement other forms of serialization, such as spin-locks, which use central processing unit (CPU) cycles and interrupts that are resolved by an operating system. Some examples disclosed herein provide a performance improvement on a system level from using laser scatter/interference patterns to provide a serialization technique. This reduces the need to utilize CPU and other system resources to validate serialization. Some examples use the gating laser as the data writing laser. In some examples, the techniques disclosed herein may be performed without interference or damage to the data being stored in the holographic unit. Some examples account for interference from multiple different laser sources, allowing for stronger parallelization. Some examples use a reference angle to generate different interference patterns to identify users, which may be used to prioritize the users into a queue.

An example of the present disclosure is directed to a method for holographic storage hardware enabled locking, which includes directing a first reference beam associated with a first process at a storage location in a holographic data storage medium. The method includes detecting, with a detector while the first reference beam is directed at the storage location, whether a second reference beam associated with a second process is also directed at the storage location. The method includes generating, based on the detecting, a signal indicating whether the storage location is locked.

Examples of the method include various technical features that yield technical effects that provide various improvements to computer technology. For instance, some examples include the technical features of detecting, with a detector while the first reference beam is directed at the storage location, whether a second reference beam associated with a second process is also directed at the storage location; and generating, based on the detecting, a signal indicating whether the storage location is locked. These technical features yield the technical effect of providing faster and more secure serialization beyond what current operating system enabled features allow. Using hardware, including one or more laser light sources and the detector, to facilitate serialization frees up computing resources to allow for greater efficiency from the system's standpoint while serializing on various resources. This hardware-based locking that uses the interference of reference beams provides faster and more efficient locking structures on the hardware level instead of implementing extra checks in the operating system layer.

In some examples of the method, the second reference beam is initially directed at the storage location while the first reference beam is already directed at the storage location, and the signal indicates that the storage location is locked and results in prevention of the second process from writing data to the storage location while the storage location is locked. These technical features yield the technical effect of providing faster and more secure serialization for multiple processes attempting to concurrently access the same storage location, including to write data to the storage location, beyond what current operating system enabled features allow.

In some examples of the method, the second reference beam is initially directed at the storage location after the first reference beam is already directed at the storage location, and the signal indicates that the storage location is locked and results in prevention of the second process from reading data from the storage location while the storage location is locked. These technical features yield the technical effect of providing faster and more secure serialization for multiple processes attempting to concurrently access the same storage location, including to read data from the storage location, beyond what current operating system enabled features allow.

Some examples of the method further include generating the first reference beam with a first laser light source, and generating the second reference beam with a second laser light source. These technical features yield the technical effect of being able to account for interference from multiple different laser light sources, allowing for stronger parallelization.

Some examples of the method further include generating, with a gating light source, a gating and data beam associated with the first process, where the gating and data beam carries a data pattern to be stored; and directing the gating and data beam at the storage location in the holographic data storage medium to sensitize the storage location for writing, where the gating and data beam interacts with the first reference beam to store the data pattern at the storage location. These technical features yield the technical effect of using the gating light source to generate a beam to both sensitize the storage location for writing and carry the data pattern to be written, which results in a more efficient hardware configuration and facilitates hardware-based locking.

In some examples of the method, directing the first reference beam at the storage location in the holographic data storage medium generates a reconstructed data beam that includes a reconstructed data pattern, and the method further includes receiving the reconstructed data beam with the detector. These technical features yield the technical effect of providing faster and more secure serialization for multiple processes attempting to concurrently access the same storage location, including allowing the first process to read data from the storage location without interruption from another process.

In some examples of the method, detecting whether the second reference beam associated with the second process is also directed at the storage location includes detecting whether an interference pattern exists resulting from the second reference beam interfering with the first reference beam. These technical features yield the technical effect of using the interference pattern to facilitate serialization, which reduces the need to implement other forms of serialization, such as spin-locks, which use CPU cycles and interrupts, which use an operating system to resolve.

In some examples of the method, the signal indicates that the storage location is locked, and the method further includes providing a notification to the second process that the storage location is locked. These technical features yield the technical effect of facilitating serialization by providing a notification, based on a hardware-level generated signal, to a process attempting to access the storage location.

Another example of the present disclosure is directed to an apparatus for holographic storage hardware enabled locking. The apparatus includes a first laser light source to generate a first reference beam associated with a first process. The apparatus includes a mirror to direct the first reference beam at a storage location in a holographic data storage medium. The apparatus includes a detector to detect, while the first reference beam is directed at the storage location, whether a second reference beam associated with a second process is also directed at the storage location, and generate, based on detection of the detector, a signal indicating whether the storage location is locked.

Examples of the apparatus include various technical features that yield technical effects that provide various improvements to computer technology. For instance, some examples include the technical features of a detector to detect, while the first reference beam is directed at the storage location, whether a second reference beam associated with a second process is also directed at the storage location, and generate, based on detection of the detector, a signal indicating whether the storage location is locked. These technical features yield the technical effect of providing faster and more secure serialization beyond what current operating system enabled features allow. Using hardware, including one or more laser light sources and the detector, to facilitate serialization frees up computing resources to allow for greater efficiency from the system's standpoint while serializing on various resources. This hardware-based locking that uses the interference of reference beams provides faster and more efficient locking structures on the hardware level instead of implementing extra checks in the operating system layer.

In some examples of the apparatus, the second reference beam is initially directed at the storage location while the first reference beam is already directed at the storage location, and the signal indicates that the storage location is locked and results in prevention of the second process from writing data to the storage location while the storage location is locked. These technical features yield the technical effect of providing faster and more secure serialization for multiple processes attempting to concurrently access the same storage location, including to write data to the storage location, beyond what current operating system enabled features allow.

In some examples of the apparatus, the second reference beam is initially directed at the storage location after the first reference beam is already directed at the storage location, and the signal indicates that the storage location is locked and results in prevention of the second process from reading data from the storage location while the storage location is locked. These technical features yield the technical effect of providing faster and more secure serialization for multiple processes attempting to concurrently access the same storage location, including to read data from the storage location, beyond what current operating system enabled features allow.

Some examples of the apparatus further include a second laser light source to generate the second reference beam.

These technical features yield the technical effect of being able to account for interference from multiple different laser light sources, allowing for stronger parallelization.

Some examples of the apparatus further include a gating light source to generate a gating and data beam associated with the first process, where the gating and data beam carries a data pattern to be stored, where the gating and data beam is directed at the storage location in the holographic data storage medium to sensitize the storage location for writing, and where the gating and data beam interacts with the first reference beam to store the data pattern at the storage location. These technical features yield the technical effect of using the gating light source to generate a beam to both sensitize the storage location for writing and carry the data pattern to be written, which results in a more efficient hardware configuration and facilitates hardware-based locking.

In some examples of the apparatus, directing the first reference beam at the storage location in the holographic data storage medium generates a reconstructed data beam that includes a reconstructed data pattern, and the detector is to receive the reconstructed data beam. These technical features yield the technical effect of providing faster and more secure serialization for multiple processes attempting to concurrently access the same storage location, including allowing the first process to read data from the storage location without interruption from another process.

In some examples of the apparatus, detecting whether the second reference beam associated with the second process is also directed at the storage location includes detecting whether an interference pattern exists resulting from the second reference beam interfering with the first reference beam. These technical features yield the technical effect of using the interference pattern to facilitate serialization, which reduces the need to implement other forms of serialization, such as spin-locks, which use CPU cycles and interrupts, which use an operating system to resolve.

Another example of the present disclosure is directed to a system for holographic storage hardware enabled locking. The system includes a storage controller to handle read requests and write requests directed to a holographic data storage medium. The system includes a gating light source to facilitate writing of data to the holographic data storage medium. The system includes a first laser light source to generate a first reference beam associated with a first process. The system includes a mirror to direct the first reference beam at a storage location in the holographic data storage medium. The system includes a detector to detect, while the first reference beam is directed at the storage location, whether a second reference beam associated with a second process is also directed at the storage location, and output to the storage controller, based on detection of the detector, a signal indicating whether the storage location is locked.

Examples of the system include various technical features that yield technical effects that provide various improvements to computer technology. For instance, some examples include the technical features of a detector to detect, while the first reference beam is directed at the storage location, whether a second reference beam associated with a second process is also directed at the storage location, and output to the storage controller, based on detection of the detector, a signal indicating whether the storage location is locked. These technical features yield the technical effect of providing faster and more secure serialization beyond what current operating system enabled features allow. Using hardware, including one or more laser light sources and the detector, to facilitate serialization frees up computing resources to allow for greater efficiency from the system's standpoint while serializing on various resources. This hardware-based locking that uses the interference of reference beams provides faster and more efficient locking structures on the hardware level instead of implementing extra checks in the operating system layer.

In some examples of the system, the second reference beam is initially directed at the storage location while the first reference beam is already directed at the storage location, and the signal indicates that the storage location is locked and results in prevention of the second process from writing data to the storage location while the storage location is locked. These technical features yield the technical effect of providing faster and more secure serialization for multiple processes attempting to concurrently access the same storage location, including to write data to the storage location, beyond what current operating system enabled features allow.

In some examples of the system, the second reference beam is initially directed at the storage location after the first reference beam is already directed at the storage location, and the signal indicates that the storage location is locked and results in prevention of the second process from reading data from the storage location while the storage location is locked. These technical features yield the technical effect of providing faster and more secure serialization for multiple processes attempting to concurrently access the same storage location, including to read data from the storage location, beyond what current operating system enabled features allow.

Some examples of the system further include a second laser light source to generate the second reference beam. These technical features yield the technical effect of being able to account for interference from multiple different laser light sources, allowing for stronger parallelization.

In some examples of the system, the gating light source is to generate a gating and data beam associated with the first process, where the gating and data beam carries a data pattern to be stored, where the gating and data beam is directed at the storage location in the holographic data storage medium to sensitize the storage location for writing, and where the gating and data beam interacts with the first reference beam to store the data pattern at the storage location. These technical features yield the technical effect of using the gating light source to generate a beam to both sensitize the storage location for writing and carry the data pattern to be written, which results in a more efficient hardware configuration and facilitates hardware-based locking.

Another example of the present disclosure is directed to a method for holographic storage hardware enabled locking, which includes generating a plurality of reference beams, including a first reference beam associated with a first process and a second reference beam associated with a second process. The method includes directing the first reference beam at a storage location in a holographic data storage medium. The method includes detecting, with a detector while the first reference beam is directed at the storage location, whether the second reference beam is causing interference with the first reference beam. The method includes generating, based on the detecting, a signal indicating whether the storage location is locked.

Examples of the method include various technical features that yield technical effects that provide various improvements to computer technology. For instance, some examples include the technical features of detecting, with a detector while the first reference beam is directed at the storage location, whether the second reference beam is causing interference with the first reference beam; and generating, based on the detecting, a signal indicating whether the storage location is locked. These technical features yield the technical effect of providing faster and more secure serialization beyond what current operating system enabled features allow. Using hardware, including one or more laser light sources and the detector, to facilitate serialization frees up computing resources to allow for greater efficiency from the system's standpoint while serializing on various resources. This hardware-based locking that uses the interference of reference beams provides faster and more efficient locking structures on the hardware level instead of implementing extra checks in the operating system layer.

In some examples of the method, the second reference beam is initially directed at the storage location while the first reference beam is already directed at the storage location, and the signal indicates that the storage location is locked and results in prevention of the second process from writing data to the storage location while the storage location is locked. These technical features yield the technical effect of providing faster and more secure serialization for multiple processes attempting to concurrently access the same storage location, including to write data to the storage location, beyond what current operating system enabled features allow.

In some examples of the method, the second reference beam is initially directed at the storage location after the first reference beam is already directed at the storage location, and the signal indicates that the storage location is locked and results in prevention of the second process from reading data from the storage location while the storage location is locked. These technical features yield the technical effect of providing faster and more secure serialization for multiple processes attempting to concurrently access the same storage location, including to read data from the storage location, beyond what current operating system enabled features allow.

Another example of the present disclosure is directed to an apparatus for holographic storage hardware enabled locking, which includes a plurality of laser light sources to generate a plurality of reference beams, including a first reference beam associated with a first process and a second reference beam associated with a second process. The apparatus includes a mirror to direct the first reference beam at a storage location in a holographic data storage medium. The apparatus includes a detector to detect, while the first reference beam is directed at the storage location, whether the second reference beam is causing interference with the first reference beam, and generate, based on detection of the detector, a signal indicating whether the storage location is locked.

Examples of the apparatus include various technical features that yield technical effects that provide various improvements to computer technology. For instance, some examples include the technical features of a detector to detect, while the first reference beam is directed at the storage location, whether the second reference beam is causing interference with the first reference beam, and generate, based on detection of the detector, a signal indicating whether the storage location is locked. These technical features yield the technical effect of providing faster and more secure serialization beyond what current operating system enabled features allow. Using hardware, including one or more laser light sources and the detector, to facilitate serialization frees up computing resources to allow for greater efficiency from the system's standpoint while serializing on various resources. This hardware-based locking that uses the interference of reference beams provides faster and more efficient locking structures on the hardware level instead of implementing extra checks in the operating system layer.

Some examples of the apparatus further include a gating light source to generate a gating and data beam associated with the first process, where the gating and data beam carries a data pattern to be stored, where the gating and data beam is directed at the storage location in the holographic data storage medium to sensitize the storage location for writing, and where the gating and data beam interacts with the first reference beam to store the data pattern at the storage location. These technical features yield the technical effect of using the gating light source to generate a beam to both sensitize the storage location for writing and carry the data pattern to be written, which results in a more efficient hardware configuration and facilitates hardware-based locking.

FIG. 1 sets forth an example computing environment 100 according to aspects of the present disclosure. Computing environment 100 contains an example of an environment for the execution of at least some of the computer code involved in performing the various methods described herein, such as holographic storage management module 107. In some examples, holographic storage management module 107 may be included as part of operating system 122. Holographic storage management module 107 performs various functions related to holographic data storage, such as handling read requests and write requests from one or more processes that are directed to a holographic data storage medium. In addition to holographic storage management module 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and holographic storage management module 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in holographic storage management module 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in holographic storage management module 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 sets forth an example holographic data storage system 200 according to aspects of the present disclosure. In some examples, holographic data storage system 200 may be incorporated into computing environment 100 (FIG. 1). Holographic data storage system 200 includes storage controller 202 and holographic data storage apparatus 218. Storage controller 202 includes processor 206, memory 208, and data cache 212, which are all communicatively coupled to each other via communication link 209. In some examples, processor 206 and memory 208 may be configured to implement some or all of the functionality of holographic storage management module 107 (FIG. 1). In some examples, storage controller 202 receives read requests and write requests from one or more processes via communication link 215. Processor 206 controls the holographic data storage apparatus 218 to cause data to be read from and written to the holographic data storage apparatus 218. Some data may be temporarily stored in data cache 212 to provide faster access to the data.

Figure 3:
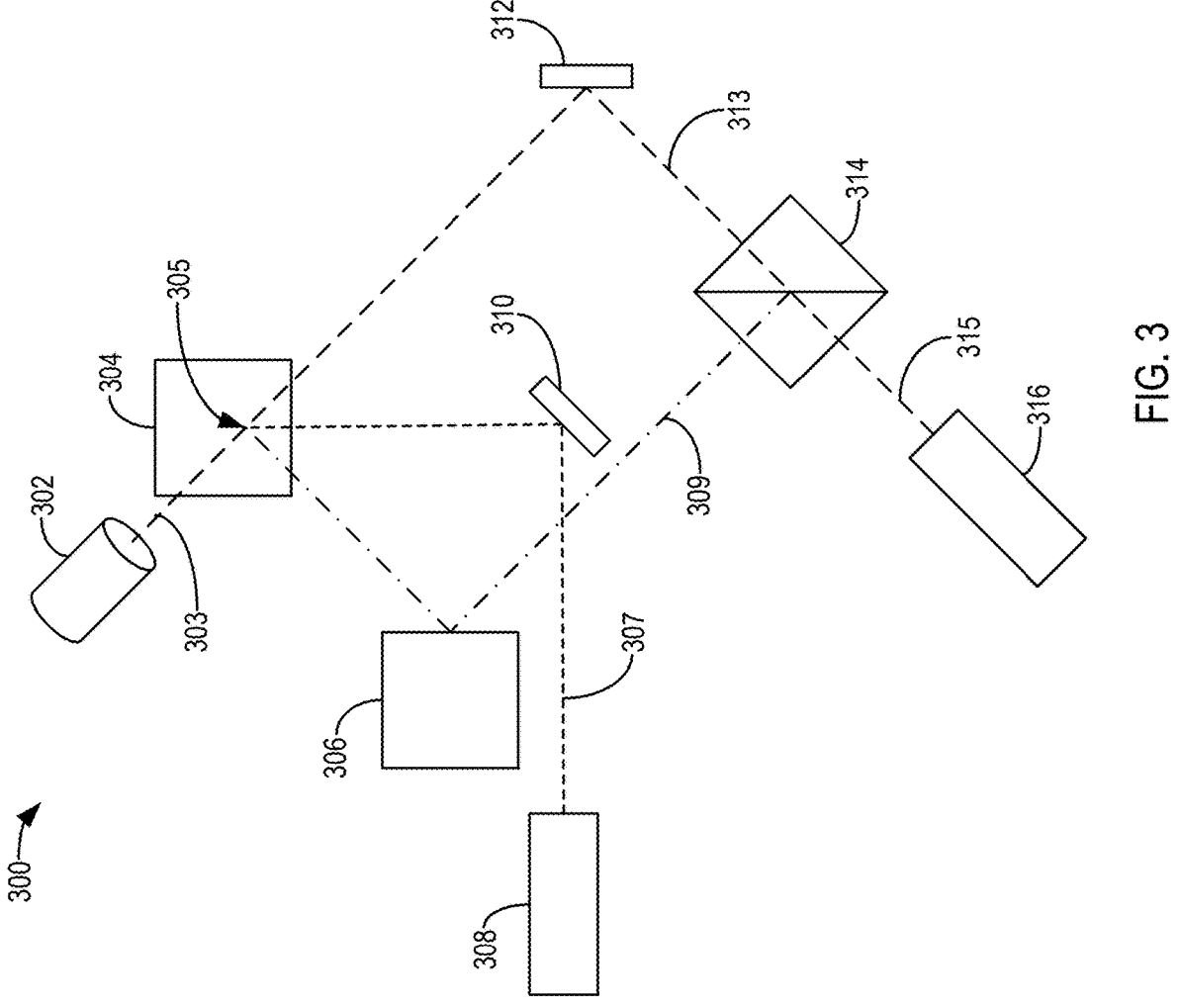
FIG. 3 sets forth an example holographic data storage apparatus according to aspects of the present disclosure.

FIG. 3 sets forth an example holographic data storage apparatus 300 according to aspects of the present disclosure. Holographic data storage apparatus 300 is an example implementation of the holographic data storage apparatus 218 shown in FIG. 2. Holographic data storage apparatus 300 includes detector 302, holographic data storage medium 304, spatial light modulator 306, gating light source 308, mirrors 310 and 312, beam splitter 314, and laser light source 316. In some examples, detector 302 may include an optical sensor array. In some examples, holographic data storage medium 304 is a photosensitive storage medium, such as a crystal or a polymer. In some examples, spatial light modulator 306 is an electrically-addressed spatial light modulator (EASLM) device or an optically-addressed spatial light modulator (OASLM) device. The spatial light modulator 306 may be translucent, and information may be represented by either a light or a dark pixel on the spatial light modulator 306. The spatial light modulator 306 may modulate a data beam with data to be written to the holographic data storage medium 304 by acting as a fine shutter system, passing and blocking light at points corresponding to logical ones and zeros. In some examples, gating light source 308 is a laser light source.

For a write operation, laser light source 316 generates a beam 315 that is split by the beam splitter 314 into two beams, which are a data beam 309 and a reference beam 313 (which are represented by dashed lines). The data beam 309 picks up an image displayed by the spatial light modulator 306 and is directed towards a specific storage location 305 of the holographic data storage medium 304. Reference beam 313 is reflected off of mirror 312 and directed towards the storage location 305 of the holographic data storage medium 304. The gating light source 308 generates a gating beam 307 that is reflected off of mirror 310 and directed towards the storage location 305 of the holographic data storage medium 304. The gating beam 307 from the gating light source 308 sensitizes the storage location 305 of the holographic data storage medium 304 for the write operation. At the holographic data storage medium 304, the reference beam 313 interferes with the data beam 309 to form an interference pattern in the holographic data storage medium 304, which is recorded into the holographic data storage medium 304 as a hologram.

For a read operation, the data beam 309 is not used, and the reference beam 313 is reflected off of mirror 312 and directed towards the storage location 305 of the holographic data storage medium 304. As the reference beam 313 interferes with the interference pattern encoded into the holographic data storage medium 304 at storage location 305, a reconstructed data beam 303 is generated that includes an image resembling the image that was previously displayed (during the write operation) by the spatial light modulator 306. In some examples, the reference beam 313 is sent at the same angle into the holographic data storage medium 304 as was used for the write operation, and diffracts off the hologram to recreate the data beam 309 into the detector 302. The detector 302 is disposed a distance away from the holographic data storage medium 304, and digitally captures the image from the reconstructed data beam 303.

Figure 4:
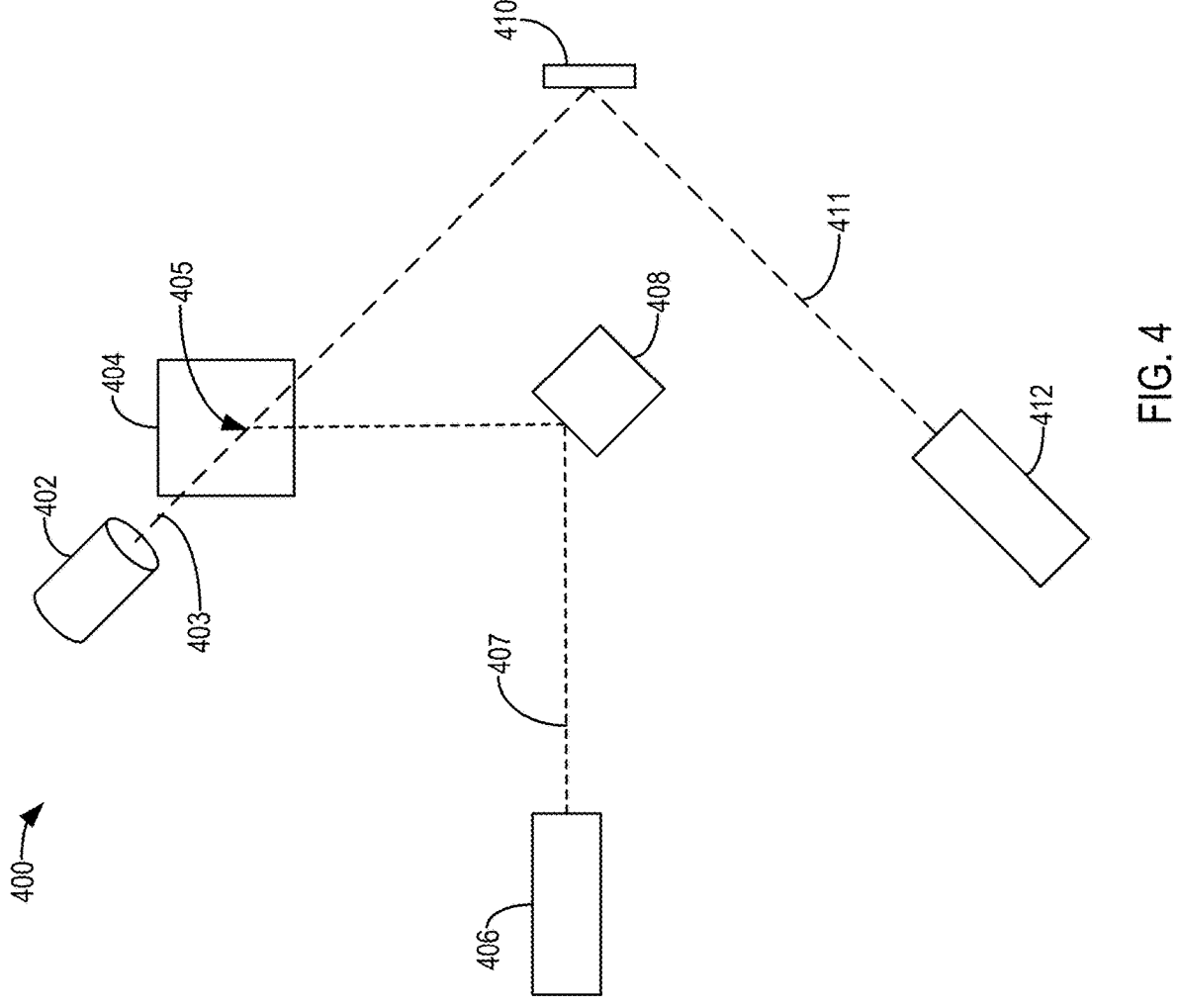
FIG. 4 sets forth an example holographic data storage apparatus according to further aspects of the present disclosure.

FIG. 4 sets forth an example holographic data storage apparatus 400 according to further aspects of the present disclosure. Holographic data storage apparatus 400 is another example implementation of the holographic data storage apparatus 218 shown in FIG. 2. Holographic data storage apparatus 400 includes detector 402, holographic data storage medium 404, gating light source 406, spatial light modulator 408, mirror 410, and laser light source 412. In some examples, detector 402 may include an optical sensor array. In some examples, holographic data storage medium 404 is a photosensitive storage medium, such as a crystal or a polymer. In some examples, spatial light modulator 408 is an electrically-addressed spatial light modulator (EASLM) device or an optically-addressed spatial light modulator (OASLM) device. The spatial light modulator 408 may be translucent, and information may be represented by either a light or a dark pixel on the spatial light modulator 408. The spatial light modulator 408 may modulate a data beam with data to be written to the holographic data storage medium 404 by acting as a fine shutter system, passing and blocking light at points corresponding to logical ones and zeros. In some examples, gating light source 406 is a laser light source.

For a write operation, laser light source 412 generates a reference beam 411 that is reflected off of mirror 410 and directed towards a storage location 405 of the holographic data storage medium 404. The gating light source 406 generates a gating and data beam 407 that is directed towards the spatial light modulator 408. The reference beam 411 and the gating and data beam 407 are represented in FIG. 4 by different dashed lines. The gating and data beam 407 picks up an image displayed by the spatial light modulator 408 and is directed towards the storage location 405 of the holographic data storage medium 404. The gating and data beam 407 from the gating light source 406 sensitizes the storage location 405 of the holographic data storage medium

404 for the write operation, and also carries the data to be written for the write operation. At the holographic data storage medium 404, the reference beam 411 interferes with the gating and data beam 407 to form an interference pattern in the holographic data storage medium 404, which is recorded into the holographic data storage medium 404 as a hologram.

For a read operation, the gating and data beam 407 is not used, and the reference beam 411 is reflected off of mirror 410 and directed towards the storage location 405 of the holographic data storage medium 404. As the reference beam 411 interferes with the interference pattern encoded into the holographic data storage medium 404 at storage location 405, a reconstructed data beam 403 is generated that includes an image resembling the image that was previously displayed (during the write operation) by the spatial light modulator 408. In some examples, the reference beam 411 is sent at the same angle into the holographic data storage medium 404 as was used for the write operation, and diffracts off the hologram to recreate the original data beam into the detector 402. The detector 402 is disposed a distance away from the holographic data storage medium 404, and digitally captures the image from the reconstructed data beam 403.

Figure 5:
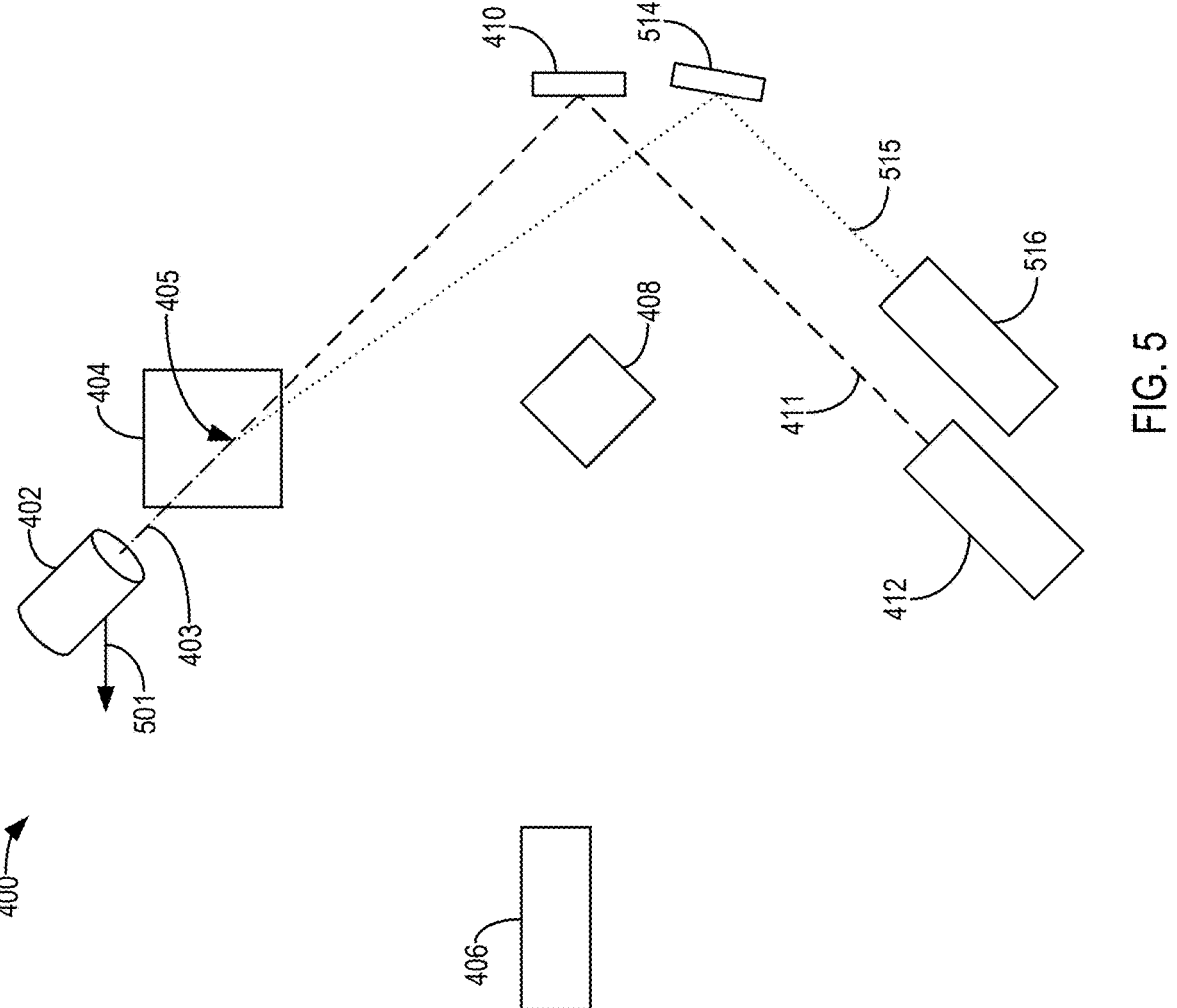
FIG. 5 sets forth an example of attempted concurrent read operations in the holographic data storage apparatus shown in FIG. 4 according to aspects of the present disclosure.

FIG. 5 sets forth an example of attempted concurrent read operations in the holographic data storage apparatus 400 shown in FIG. 4 according to aspects of the present disclosure. In addition to including the elements shown in FIG. 4, the holographic data storage apparatus 400 shown in FIG. 5 also includes second laser light source 516 and mirror 514. For a read operation, the gating and data beam 407 (FIG. 4) from gating light source 406 is not used, and the reference beam 411 generated by laser light source 412 is reflected off of mirror 410 and directed towards the storage location 405 of the holographic data storage medium 404. In an example, reference beam 411 is associated with a first process that has initiated a first read operation for the holographic data storage medium 404. Since reference beam 411 is the first reference beam to access the storage location 405, the first process essentially has a lock on the storage location 405. While the reference beam 411 is directed towards the storage location 405, laser light source 516 begins to generate a second reference beam 515 that is reflected off of mirror 514 and directed towards the storage location 405 of the holographic data storage medium 404. In an example, the second reference beam 515 is associated with a second process that has initiated a second read operation for the holographic data storage medium 404.

The second reference beam 515 causes interference with the reference beam 411 at the storage location 405, which is indicated in the reconstructed data beam 403 that is directed at the detector 402. The reference beams 411 and 515 and the reconstructed data beam 403 are represented in FIG. 5 by different dashed lines, with the reconstructed data beam 403 being represented by a combination of the dashed lines for reference beams 411 and 515.

Based on the received reconstructed data beam 403, the detector 402 detects that interference from the second reference beam 515 has occurred, and in response, generates and outputs a lock notification signal 501. In some examples, the lock notification signal 501 is a hardware generated signal. Detector 402 may detect that the interference pattern initially caused by a single reference beam (e.g., reference beam 411) interfering with the holographic data storage medium 404 changes when the second reference beam 515 begins its interference. In some examples, the lock notification signal 501 may be provided to a storage controller (e.g., storage controller 202 (FIG. 2)), and may be handled by the holographic storage management module 107 (FIG. 1). For example, the holographic storage management module 107 may, in response to the lock notification signal 501, notify the second process that the requested data in the second read operation is locked. The second process then stops the second read operation and waits for the lock. In other examples, interference between two or more reference beams may be ignored for read operations.

The first read operation for the first process may continue. As the reference beam 411 associated with the first process interferes with the interference pattern encoded into the holographic data storage medium 404 at storage location 405, the reconstructed data beam 403 includes an interference pattern that is the same as the interference pattern that was previously generated (during the write operation). In some examples, the reference beam 411 is sent at the same angle into the holographic data storage medium 404 as was used for the write operation, and diffracts off the hologram to recreate the original data beam into the detector 402. The detector 402 is disposed a distance away from the holographic data storage medium 404, and digitally captures the image from the reconstructed data beam 403.

Figure 6:
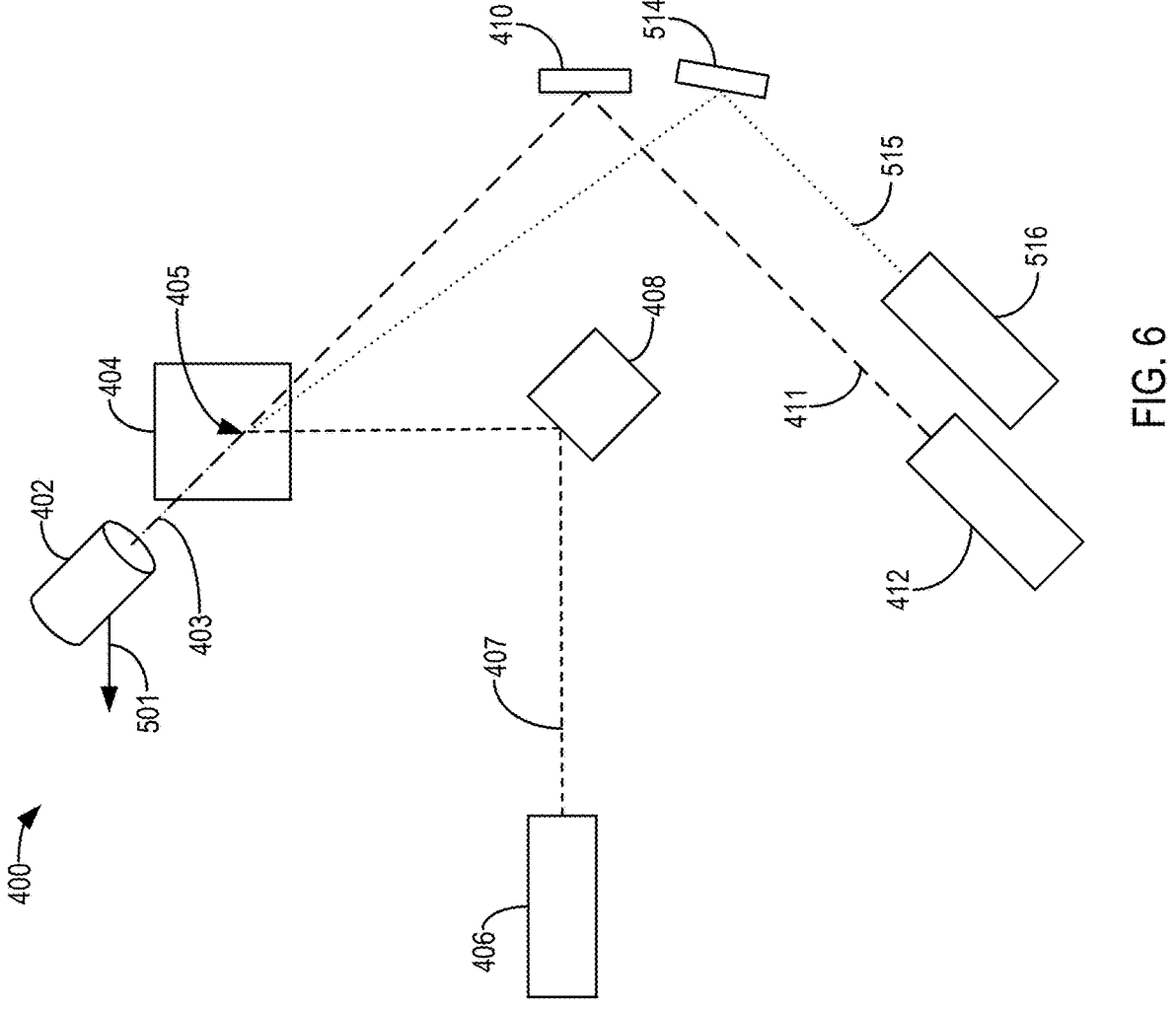
FIG. 6 sets forth an example of attempted concurrent write operations in the holographic data storage apparatus shown in FIG. 4 according to aspects of the present disclosure.

FIG. 6 sets forth an example of attempted concurrent write operations in the holographic data storage apparatus 400 shown in FIG. 4 according to aspects of the present disclosure. For a write operation, laser light source 412 generates a reference beam 411 that is reflected off of mirror 410 and directed towards a storage location 405 of the holographic data storage medium 404. In an example, reference beam 411 is associated with a first process that has initiated a first write operation for the holographic data storage medium 404. Since reference beam 411 is the first reference beam to access the storage location 405, the first process essentially has a lock on the storage location 405. While the reference beam 411 is directed towards the storage location 405, laser light source 516 begins to generate a second reference beam 515 that is reflected off of mirror 514 and directed towards the storage location 405 of the holographic data storage medium 404. In an example, the second reference beam 515 is associated with a second process that has initiated a second write operation for the holographic data storage medium 404.

The second reference beam 515 causes interference with the reference beam 411 at the storage location 405, which is indicated in the reconstructed data beam 403 that is directed at the detector 402. The reference beams 411 and 515 and the reconstructed data beam 403 are represented in FIG. 6 by different dashed lines, with the reconstructed data beam 403 being represented by a combination of the dashed lines for reference beams 411 and 515.

Based on the received reconstructed data beam 403, the detector 402 detects that interference from the second reference beam 515 has occurred, and in response, generates and outputs a lock notification signal 501. The lock notification signal 501 may be a hardware generated signal. Detector 402 may detect that the interference pattern caused during the first write operation changes when the second reference beam 515 begins its interference. In some examples, the lock notification signal 501 may be provided to a storage controller (e.g., storage controller 202 (FIG. 2)), and may be handled by holographic storage management module 107 (FIG. 1). For example, the holographic storage management module 107 may, in response to the lock notification signal 501, notify the second process that the storage location for the second write operation is locked. The second process then stops the second write operation and waits for the lock.

The first write operation for the first process may continue. The gating light source 406 generates a gating and data beam 407 that is directed towards the spatial light modulator 408. The gating and data beam 407 picks up an image displayed by the spatial light modulator 408 and is directed towards the storage location 405 of the holographic data storage medium 404. The gating and data beam 407 from the gating light source 406 sensitizes the storage location 405 of the holographic data storage medium 404 for the write operation, and also carries the data to be written for the write operation. At the holographic data storage medium 404, the reference beam 411 interferes with the gating and data beam 407 to form an interference pattern in the holographic data storage medium 404, which is recorded into the holographic data storage medium 404 as a hologram.

It is noted that the locking techniques described above with reference to FIG. 5 and FIG. 6 for holographic data storage apparatus 400 are also applicable to the holographic data storage apparatus 300 (FIG. 3).

FIG. 7 sets forth a flowchart of an example method 700 for holographic storage hardware enabled locking according to aspects of the present disclosure. In a particular embodiment, the method 700 may be performed by holographic data storage apparatus 300 or 400, and may be performed utilizing holographic storage management module 107 (FIG. 1). Method 700 includes directing 702 a first reference beam associated with a first process at a storage location in a holographic data storage medium. Method 700 includes detecting 704, with a detector while the first reference beam is directed at the storage location, whether a second reference beam associated with a second process is also directed at the storage location. The method 700 includes generating 706, based on the detecting, a signal indicating whether the storage location is locked.

FIG. 8 sets forth a flowchart of an example method 800 for holographic storage hardware enabled locking according to further aspects of the present disclosure. In a particular embodiment, the method 800 may be performed by holographic data storage apparatus 300 or 400, and may be performed utilizing holographic storage management module 107 (FIG. 1). Method 800 includes generating 802 a plurality of reference beams, including a first reference beam associated with a first process and a second reference beam associated with a second process. Method 800 includes directing 804 the first reference beam at a storage location in a holographic data storage medium. Method 800 includes detecting 806, with a detector while the first reference beam is directed at the storage location, whether the second reference beam is causing interference with the first reference beam. Method 800 includes generating 808, based on the detecting, a signal indicating whether the storage location is locked.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for holographic storage hardware enabled locking, comprising:
   directing a first reference beam associated with a first process at a storage location in a holographic data storage medium, wherein the first reference beam is generated with a first laser light source;
   detecting, with a detector while the first reference beam is directed at the storage location, whether a second reference beam associated with a second process is also directed at the storage location, wherein the second reference beam is generated with a second laser light source; and
   generating, based on the detecting, a signal indicating whether the storage location is locked.

2. The method of claim 1, wherein the second reference beam is initially directed at the storage location while the first reference beam is already directed at the storage location, and wherein the signal indicates that the storage location is locked and results in prevention of the second process from writing data to the storage location while the storage location is locked.

3. The method of claim 1, wherein the second reference beam is initially directed at the storage location after the first reference beam is already directed at the storage location, and wherein the signal indicates that the storage location is locked and results in prevention of the second process from reading data from the storage location while the storage location is locked.

4. The method of claim 1, and further comprising:
generating the first reference beam with the first laser light source; and
generating the second reference beam with the second laser light source, wherein the second reference beam is initially directed at the storage location while the first reference beam is already directed at the storage location.

5. The method of claim 1, and further comprising:
generating, with a gating light source, a gating and data beam associated with the first process, wherein the gating and data beam carries a data pattern to be stored; and
directing the gating and data beam at the storage location in the holographic data storage medium to sensitize the storage location for writing, wherein the gating and data beam interacts with the first reference beam to store the data pattern at the storage location.

6. The method of claim 1, wherein directing the first reference beam at the storage location in the holographic data storage medium generates a reconstructed data beam that includes a reconstructed data pattern, and wherein the method further comprises:
receiving the reconstructed data beam with the detector.

7. The method of claim 1, wherein detecting whether the second reference beam associated with the second process is also directed at the storage location includes detecting whether an interference pattern exists resulting from the second reference beam interfering with the first reference beam.

8. The method of claim 1, wherein the signal indicates that the storage location is locked, and wherein the method further comprises:
providing a notification to the second process that the storage location is locked.

9. An apparatus for holographic storage hardware enabled locking, comprising:
a first laser light source to generate a first reference beam associated with a first process;
a mirror to direct the first reference beam at a storage location in a holographic data storage medium; and
a detector to detect, while the first reference beam is directed at the storage location, whether a second reference beam associated with a second process is also directed at the storage location, and generate, based on detection of the detector, a signal indicating whether the storage location is locked,
wherein the second reference beam is generated with a second laser light source.

10. The apparatus of claim 9, wherein the second reference beam is initially directed at the storage location while the first reference beam is already directed at the storage location, and wherein the signal indicates that the storage location is locked and results in prevention of the second process from writing data to the storage location while the storage location is locked.

11. The apparatus of claim 9, wherein the second reference beam is initially directed at the storage location after the first reference beam is already directed at the storage location, and wherein the signal indicates that the storage location is locked and results in prevention of the second process from reading data from the storage location while the storage location is locked.

12. The apparatus of claim 9, and further comprising:
the second laser light source to generate the second reference beam.

13. The apparatus of claim 9, and further comprising:
a gating light source to generate a gating and data beam associated with the first process, wherein the gating and data beam carries a data pattern to be stored, wherein the gating and data beam is directed at the storage location in the holographic data storage medium to sensitize the storage location for writing, and wherein the gating and data beam interacts with the first reference beam to store the data pattern at the storage location.

14. The apparatus of claim 9, wherein directing the first reference beam at the storage location in the holographic data storage medium generates a reconstructed data beam that includes a reconstructed data pattern, and wherein the detector is to receive the reconstructed data beam.

15. The apparatus of claim 9, wherein detecting whether the second reference beam associated with the second process is also directed at the storage location includes detecting whether an interference pattern exists resulting from the second reference beam interfering with the first reference beam.

16. A system for holographic storage hardware enabled locking, comprising:
a storage controller to handle read requests and write requests directed to a holographic data storage medium;
a gating light source to facilitate writing of data to the holographic data storage medium;
a first laser light source to generate a first reference beam associated with a first process;
a mirror to direct the first reference beam at a storage location in the holographic data storage medium; and
a detector to detect, while the first reference beam is directed at the storage location, whether a second reference beam associated with a second process is also directed at the storage location, and output to the storage controller, based on detection of the detector, a signal indicating whether the storage location is locked, wherein the second reference beam is generated with a second laser light source.

17. The system of claim 16, wherein the second reference beam is initially directed at the storage location while the first reference beam is already directed at the storage location, and wherein the signal indicates that the storage location is locked and results in prevention of the second process from writing data to the storage location while the storage location is locked.

18. The system of claim 16, wherein the second reference beam is initially directed at the storage location after the first reference beam is already directed at the storage location, and wherein the signal indicates that the storage location is locked and results in prevention of the second process from reading data from the storage location while the storage location is locked.

19. The system of claim 16, and further comprising:
the second laser light source to generate the second reference beam.

20. The system of claim 16, wherein the gating light source is to generate a gating and data beam associated with the first process, wherein the gating and data beam carries a data pattern to be stored, wherein the gating and data beam is directed at the storage location in the holographic data storage medium to sensitize the storage location for writing, and wherein the gating and data beam interacts with the first reference beam to store the data pattern at the storage location.

21. A method for holographic storage hardware enabled locking, comprising:

generating a plurality of reference beams, including a first reference beam associated with a first process and a second reference beam associated with a second process, wherein the first reference beam is generated with a first laser light source, and wherein the second reference beam is generated with a second laser light source;

directing the first reference beam at a storage location in a holographic data storage medium;

detecting, with a detector while the first reference beam is directed at the storage location, whether the second reference beam is causing interference with the first reference beam; and generating, based on the detecting, a signal indicating whether the storage location is locked.

22. The method of claim 21, wherein the second reference beam is initially directed at the storage location while the first reference beam is already directed at the storage location, and wherein the signal indicates that the storage location is locked and results in prevention of the second process from writing data to the storage location while the storage location is locked.

23. The method of claim 21, wherein the second reference beam is initially directed at the storage location after the first reference beam is already directed at the storage location, and wherein the signal indicates that the storage location is locked and results in prevention of the second process from reading data from the storage location while the storage location is locked.

24. An apparatus for holographic storage hardware enabled locking, comprising:

a plurality of laser light sources to generate a plurality of reference beams, including a first reference beam associated with a first process and a second reference beam associated with a second process, wherein the first reference beam is generated with a first laser light source, and wherein the second reference beam is generated with a second laser light source;

a mirror to direct the first reference beam at a storage location in a holographic data storage medium; and a detector to detect, while the first reference beam is directed at the storage location, whether the second reference beam is causing interference with the first reference beam, and generate, based on detection of the detector, a signal indicating whether the storage location is locked.

25. The apparatus of claim 24, and further comprising:

a gating light source to generate a gating and data beam associated with the first process, wherein the gating and data beam carries a data pattern to be stored, wherein the gating and data beam is directed at the storage location in the holographic data storage medium to sensitize the storage location for writing, and wherein the gating and data beam interacts with the first reference beam to store the data pattern at the storage location.

\* \* \* \* \*